United States Patent
Sahashi et al.

(10) Patent No.: US 9,592,818 B2
(45) Date of Patent: Mar. 14, 2017

(54) HYBRID VEHICLE DRIVE SYSTEM

(71) Applicant: TOYOTA JIDOSHA KABUSHIKI KAISHA, Toyota-shi, Aichi (JP)

(72) Inventors: Junichiro Sahashi, Susono (JP); Hirokazu Suzuki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 12 days.

(21) Appl. No.: 14/661,861

(22) Filed: Mar. 18, 2015

(65) Prior Publication Data

US 2015/0266461 A1    Sep. 24, 2015

(30) Foreign Application Priority Data

Mar. 24, 2014  (JP) .................................. 2014-060883

(51) Int. Cl.
*B60K 6/365*  (2007.10)
*B60W 10/08*  (2006.01)
(Continued)

(52) U.S. Cl.
CPC ............. *B60W 10/08* (2013.01); *B60K 6/365* (2013.01); *B60K 6/387* (2013.01); *B60K 6/445* (2013.01);
(Continued)

(58) Field of Classification Search
CPC ..................................................... B60K 6/365
See application file for complete search history.

(56) References Cited

U.S. PATENT DOCUMENTS 8,303,447 B1    11/2012  Kim et al.
2006/0046886 A1*  3/2006  Holmes .................. B60K 6/387
                                                                   475/5
(Continued)

FOREIGN PATENT DOCUMENTS

CN    102381179 A    3/2012
CN    103373214 A    10/2013
(Continued)

OTHER PUBLICATIONS

October 26, 2015 Office Action issued in U.S Appl. No. 14/626,002.
(Continued)

*Primary Examiner* — Tisha Lewis
(74) *Attorney, Agent, or Firm* — Oliff PLC (57) ABSTRACT

A hybrid vehicle drive system, which permits an efficient change of a vehicle drive mode from any one of constant-speed-ratio engine drive modes to one of electric motor drive modes, with reduced deterioration of drivability of the hybrid vehicle. The hybrid vehicle drive system is constructed such that one of the electric motor drive modes can be established by releasing one of two coupling elements which are placed in the engaged state in a presently established one of the constant-speed-ratio engine drive modes, when the drive system is required to be switched from the above-described one of the constant-speed-ratio engine drive modes to any one of the electric motor drive modes, whereby the drive system can be efficiently switched from any one of the constant-speed-ratio engine drive modes to the above-indicated one of the electric motor drive modes, by simply releasing one of the above-indicated two coupling elements.

2 Claims, 6 Drawing Sheets

(51) Int. Cl.
- *B60K 6/387* (2007.10)
- *B60K 6/445* (2007.10)
- *B60W 10/06* (2006.01)
- *B60W 20/00* (2016.01)
- *B60K 6/38* (2007.10)

(52) U.S. Cl.
CPC ............ *B60W 10/06* (2013.01); *B60W 20/10* (2013.01); *B60W 20/40* (2013.01); *B60K 2006/381* (2013.01); *Y02T 10/6239* (2013.01); *Y02T 10/6286* (2013.01); *Y10S 903/902* (2013.01); *Y10T 477/26* (2015.01)

(56) References Cited

U.S. PATENT DOCUMENTS

| | | | | |
|---|---|---|---|---|
| 2009/0275439 | A1* | 11/2009 | Kersting | B60K 6/40 475/5 |
| 2010/0203996 | A1* | 8/2010 | Kawai | B60K 6/445 475/5 |
| 2010/0273596 | A1* | 10/2010 | Seo | B60K 6/40 475/5 |
| 2010/0279817 | A1* | 11/2010 | Holmes | B60K 6/365 477/4 |
| 2011/0111906 | A1 | 5/2011 | Kim et al. | |
| 2011/0111909 | A1* | 5/2011 | Kim | B60K 6/365 475/5 |
| 2012/0052999 | A1* | 3/2012 | Kim | B60K 6/365 475/149 |
| 2012/0116622 | A1 | 5/2012 | Kim et al. | |
| 2013/0282213 | A1 | 10/2013 | Park | |
| 2013/0296089 | A1 | 11/2013 | Kim et al. | |
| 2015/0258978 | A1 | 9/2015 | Shiratori | |
| 2015/0258983 | A1 | 9/2015 | Kimura | |
| 2015/0258985 | A1 | 9/2015 | Kimura | |
| 2015/0336569 | A1 | 11/2015 | Matsubara et al. | |

FOREIGN PATENT DOCUMENTS

| | | |
|---|---|---|
| JP | 2007-069632 A | 3/2007 |
| JP | 2009-073221 A | 4/2009 |
| JP | 2010-143364 A | 7/2010 |
| JP | 2011-098712 A | 5/2011 |
| KR | 20110050894 A | 5/2011 |
| KR | 2012-0019855 A | 3/2012 |
| KR | 10-2012-0136641 A | 12/2012 |

OTHER PUBLICATIONS

May 12, 2015 Office Action issued in U.S. Appl. No. 14/635,463.
Apr. 14, 2016 Notice of Allowance issued in U.S. Appl. No. 14/626,002.
Jul. 6, 2016 Corrected Notice of Allowability issued in U.S. Appl. No. 14/626,002.
Sep. 12, 2016 Corrected Notice of Allowability issued in U.S. Appl. No. 14/626,002.

\* cited by examiner

|  | CL1 | CL2 | BK1 | BK2 |
|---|---|---|---|---|
| HV1 |  |  |  | O |
| HV2 |  | O |  |  |
| EV1 |  |  |  | O |
| EV2 |  | O |  | O |
| 1ST-SPEED | O |  |  | O |
| 2ND-SPEED |  |  | O | O |
| 3RD-SPEED | O | O |  |  |
| 4TH-SPEED |  | O | O |  |

HYBRID VEHICLE DRIVE SYSTEM

CROSS REFERENCE TO RELATED APPLICATION

The present application claims the priority from Japanese Patent Application No. 2014-060883 filed on Mar. 24, 2014, the disclosure of which is herein incorporated by reference in its entirety.

BACKGROUND OF THE INVENTION

1. Field of the Invention

The present invention relates to an improvement of a drive system of a hybrid vehicle.

2. Description of Related Art

There is known a hybrid vehicle including: a differential device which comprises a first differential mechanism and a second differential mechanism and which comprises four rotary components; an engine, a first electric motor, a second electric motor and an output rotary member which are respectively connected to the four rotary components; and a plurality of coupling elements which are provided to selectively connect the rotary components to each other or to a stationary member, to establish a selected one of a plurality of electric motor drive modes and a plurality of constant-speed-ratio engine drive modes. JP-2011-98712 A1 discloses an example of such a hybrid vehicle which is arranged to establish a selected one of a plurality of electric motor drive modes, a plurality of hybrid drive modes and a plurality of constant-speed-ratio engine drive modes, according to a selected one of different combinations of operating states of the coupling elements.

The prior art hybrid vehicle described above is required to be switched to one of the electric motor drive modes when a predetermined condition to establish this electric motor drive mode is satisfied, or when an EV switch (electric motor drive selector switch) is operated, while the hybrid vehicle is placed in one of the constant-speed-ratio engine drive modes in which the engine is used as a vehicle drive power source, for example, in one of a first-speed drive mode, a second-speed drive mode, a third-speed drive mode and a fourth-speed drive mode. However, the prior art hybrid vehicle has a problem of complicated and time-consuming drive mode switching operations involving repeated changes of the operating states of selected ones of the plurality of coupling elements in the form of clutches and brakes, due to lack of consistent procedures to establish the selected one of the different drive modes.

SUMMARY OF THE INVENTION

The present invention was made in view of the background art described above. It is therefore an object of the present invention to provide a hybrid vehicle drive system, which permits an efficient change of the vehicle drive mode from any one of the constant-speed-ratio engine drive modes to one of the electric motor drive modes, with reduced deterioration of drivability of the hybrid vehicle.

In view of the background art described above, the present inventor made an intensive study on drive mode switching operations in a hybrid vehicle including: a differential device which comprises a first differential mechanism and a second differential mechanism and which comprises four rotary components; an engine, a first electric motor, a second electric motor and an output rotary member which are respectively connected to the four rotary components; and a plurality of coupling elements which are provided to selectively connect the rotary components to each other or to a stationary member, to establish a selected one of electric motor drive modes, and a plurality of constant-speed-ratio engine drive modes. The inventor paid attention to an aspect that one of the plurality of electric motor drive modes is established in an engaged state of any one of the plurality of coupling elements, while one of the plurality of constant-speed-ratio engine drive modes is established in engaged states of any two of the coupling elements. The inventor found that there are combinations of the constant-speed-ratio engine drive mode and the electric motor drive mode to which the hybrid vehicle is switched from the constant-speed-ratio engine drive mode, in a released state of one of the coupling elements. The present invention was made on the basis of this finding.

The object indicated above is achieved according to first aspect of the present invention, which provides a drive system of a hybrid vehicle including: a differential device which comprises a first differential mechanism and a second differential mechanism and which comprises four rotary components; an engine, a first electric motor, a second electric motor and an output rotary member which are respectively connected to the four rotary components; and a plurality of coupling elements which are provided to selectively connect the rotary components to each other or to a stationary member, to establish a selected one of a plurality of electric motor drive modes and a plurality of constant-speed-ratio engine drive modes, such that one of the electric motor drive modes which is to be established is determined depending upon whether one of the coupling elements is placed in an engaged state or not, and such that one of the constant-speed-ratio engine drive modes which is to be established is determined depending upon one of combinations of two of the coupling elements which are placed in engaged states, the drive system being constructed such that one of the electric motor drive modes can be established by releasing one of the two coupling elements which are placed in the engaged state in a presently established one of the constant-speed-ratio engine drive modes, when the drive system is required to be switched from the above-described one of the plurality of constant-speed-ratio engine drive modes to any one of the above-described plurality of electric motor drive modes.

As described above, the hybrid vehicle drive system according to the first aspect of the present invention is constructed such that one of the electric motor drive modes can be established by releasing one of the two coupling elements which are placed in the engaged state to establish one of the constant-speed-ratio engine drive modes, when the drive system is required to be switched from the above-described one of the plurality of constant-speed-ratio engine drive modes to any one of the plurality of electric motor drive modes. Accordingly, the drive system can be efficiently switched from any one of the plurality of constant-speed-ratio engine drive modes to one of the electric motor drive modes, by simply releasing one of the two coupling elements placed in the engaged state in the presently established constant-speed-ratio engine drive mode, so that the deterioration of drivability of the hybrid vehicle due to a change of the drive mode from one of the constant-speed-ratio engine drive modes to the above-indicated one of the electric motor drive modes can be effectively reduced.

According to one preferred form of the invention, the plurality of electric motor drive modes include a first electric motor drive mode and a second electric motor drive mode, while the plurality of constant-speed-ratio engine drive modes include a first-speed constant-speed-ratio engine drive mode and a second-speed constant-speed-ratio engine drive mode, and the plurality of coupling elements include a first coupling element for establishing the first electric motor drive mode, a second coupling element for establishing the second electric motor drive mode together with said first coupling element, a third coupling element for establishing the first-speed constant-speed-ratio engine drive mode together with the first coupling element, and a fourth coupling element for establishing the second-speed constant-speed-ratio engine drive mode together with the first coupling element and the second coupling element. In this form of the invention, the drive system is switched from the first-speed constant-speed-ratio engine drive mode to the first electric motor drive mode by releasing the third coupling element, and from the second-speed constant-speed-ratio engine drive mode to the second electric motor drive mode by releasing the fourth coupling element and engaging the second coupling element. Accordingly, the drive system can be efficiently switched from one of the first-speed and second-speed constant-speed-ratio engine drive modes to one of the first and second electric motor drive modes, with reduced deterioration of drivability of the hybrid vehicle.

The object indicated above can also be achieved according to a second aspect of the invention, which provides a drive system of a hybrid vehicle comprising: a first differential mechanism and a second differential mechanism each of which includes at least three rotary elements and which are configured such that one of the at least three rotary elements of the first differential mechanism and one of the at least three rotary elements of the second differential mechanism are connected to each other; an engine and a first electric motor which are respectively connected to two rotary elements of the at least three rotary elements of the first differential mechanism, which two rotary elements are not connected to the above-described one of the at least three rotary elements of the second differential mechanism; a second electric motor connected to the above-described one of the at least three rotary elements of the second differential mechanism; an output rotary member connected to one of two rotary elements of the second differential mechanism, which two rotary elements are not connected to the above-described one of the at least three rotary elements of the second differential mechanism; a first clutch for selectively connecting the above-described two rotary elements of the at least three rotary elements of the first differential mechanism to each other; a second clutch for selectively connecting the rotary element of the first differential mechanism connected to the engine and the other of the above-described two rotary elements of the second differential mechanism to each other; a first brake for selectively connecting the rotary element of the first differential mechanism connected to the first electric motor to a stationary member; and a second brake for selectively connecting the other of the above-described two rotary elements of the second differential mechanism to the stationary member, and wherein: a first electric motor drive mode is established in an engaged state of the second brake; a second electric motor drive mode is established in an engaged state of the second clutch and in the engaged state of the second brake; a first-speed constant-speed-ratio engine drive mode is established in an engaged state of the first clutch and in the engaged state of the second brake; a second-speed constant-speed-ratio engine drive mode is established in an engaged state of the first brake and in the engaged state of the second brake; a third-speed constant-speed-ratio engine drive mode is established in the engaged states of the first clutch and the second clutch; a fourth-speed constant-speed-ratio engine drive mode is established in the engaged states of the second clutch and the first brake.

The hybrid vehicle drive system according to the third aspect of the invention is constructed such that the drive system is switched from the first-speed or second-speed constant-speed-ratio engine drive mode to the first electric motor drive mode, and from the third-speed or fourth-speed constant-speed-ratio engine drive mode to the second electric motor drive mode. Thus, the drive system can be efficiently switched from one of the first-speed, second-speed by releasing one coupling element, and from third-speed and fourth-speed constant-speed-ratio engine drive modes by releasing one coupling element and engaging one coupling element to respective one of the first and second electric motor drive modes, with reduced deterioration of drivability of the hybrid vehicle.

DETAILED DESCRIPTION OF PREFERRED EMBODIMENT

In the hybrid vehicle drive system according to the present invention, the differential device comprising the first differential mechanism and the second differential mechanism comprises the four rotary components when the coupling element (second clutch) disposed between a rotary element of the first differential mechanism and a rotary element of the second differential mechanism is placed in an engaged state. Preferably, the differential device comprises the four rotary components when the coupling element (second clutch) disposed between a second rotary element of the first differential mechanism and a first rotary element of the second differential mechanism is placed in the engaged state. In other words, the present invention is suitably applicable to a hybrid vehicle drive system including: a differential device comprising a first differential mechanism and a second differential mechanism and comprising four rotary components relative rotating speeds of which are represented along a vertical axis in a two-dimensional collinear chart in which relative gear ratios of the first and second differential mechanisms are taken along a horizontal axis; and an engine, a first electric motor, a second electric motor and an output rotary member which are respectively connected to the above-described four rotary components, and wherein one of the four rotary components is constituted by a rotary element of the first differential mechanism and a rotary element of the second differential mechanism which are selectively connected to each other through a coupling element (second clutch), while one of the rotary elements of the first and second differential mechanisms which are selectively connected to each other through the coupling element (second clutch) is selectively connected to a stationary member through a brake.

The above-indicated clutch and brake are hydraulically operated coupling devices operating states of which are controlled (which are placed in their engaged and released states) according to hydraulic pressures applied thereto. While frictional coupling devices of wet multiple-disc type, for example, are preferably used as the clutch and brake, meshing type coupling devices, namely, so-called "dog clutches" (claw clutches) may also be used. Alternatively, the clutch and brake may be electromagnetic clutches, magnetic powder clutches and any other clutches operating states of which are controlled (which are placed in the engaged and released) according to electric commands.

Referring to the drawings, a preferred embodiment of the present invention will be described in detail. It is to be understood that the drawings referred to below do not necessarily accurately represent ratios of dimensions of various elements.

Figure 1:
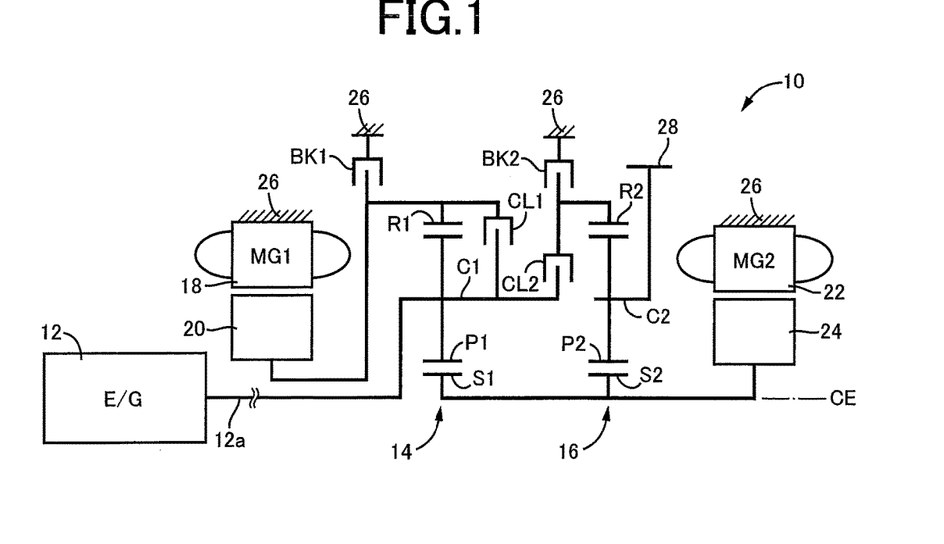
FIG. 1 is a schematic view showing an arrangement of a hybrid vehicle drive system to which the present invention is preferably employed.

FIG. 1 is the schematic view showing an arrangement of a hybrid vehicle drive system 10 (hereinafter referred to simply as a "drive system 10") constructed according to the present invention. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiment, the direction of extension of this axis CE will be referred to as an "axial direction". The drive system 10 is constructed substantially symmetrically with respect to the axis CE. In FIG. 1, a lower half of the drive system 10 is not shown.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 connected to a stationary member in the form of a housing (casing) 26, and a rotor 20, 24 disposed radially inwardly of the stator 18, 22.

The first planetary gear set 14 is a single-pinion type planetary gear set which has a gear ratio $\rho1$ and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio $\rho2$ and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is connected to the rotor 20 of the first electric motor MG1, and the carrier C1 is connected to an output shaft of the engine 12 in the form of a crankshaft 12a, while the sun gear S1 is connected to the sun gear S2 of the second planetary gear set 16 and the rotor 24 of the second electric motor MG2. In the second planetary gear set 16, the carrier C2 is connected to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

A clutch CL1 for selectively connecting and disconnecting the carrier C1 and the ring gear R1 of the first planetary gear set 14 to and from each other is disposed between the carrier C1 and the ring gear R1. A clutch CL2 for selectively connecting and disconnecting the carrier C1 of the first planetary gear set 14 and the ring gear R2 of the second planetary gear set 16 to and from each other is disposed between the carrier C1 and the ring gear R2. A brake BK1 for selectively connecting (fixing) the ring gear R1 of the first planetary gear set 14 to the stationary member in the form of the housing 26 is disposed between the ring gear R1 and the housing 26. A brake BK2 for selectively connecting (fixing) the ring gear R2 of the second planetary gear set 16 to the housing 26 is disposed between the ring gear R2 and the housing 26.

Each of the clutches CL1 and CL2 and the brakes BK1 and BK2 is preferably a hydraulically operated coupling device an operating state of which is controlled (which is engaged and released) according to a hydraulic pressure applied thereto from a hydraulic control unit 54. While wet multiple-disc type frictional coupling devices are preferably used as the coupling devices, so-called dog clutches (claw clutches) may also be used. Alternatively, the coupling devices may be electromagnetic clutches, magnetic powder clutches and any other clutches operating states of which are controlled (which are engaged and released) according to electric commands generated from an electronic control device 30.

Figure 2:
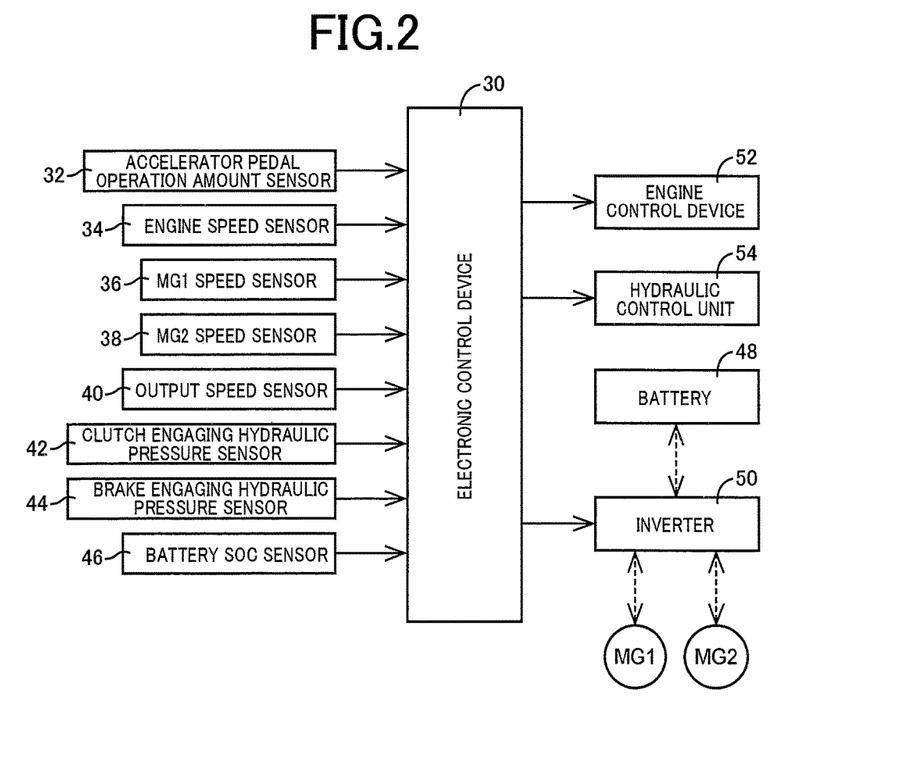
FIG. 2 is a block diagram illustrating major portions of a control system provided to control the hybrid vehicle drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of an MG1 speed sensor 36 indicative of an operating speed $N_{MG1}$ of the first electric motor MG1; an output signal of an MG2 speed sensor 38 indicative of an operating speed $N_{MG2}$ of the second electric motor MG2; an output signal of an output speed sensor 40 as a vehicle speed detecting portion indicative of a rotating speed $N_{OUT}$ of the output gear 28, which corresponds to a running speed V of the hybrid vehicle; an output signal of a clutch engaging hydraulic pressure sensor 42 indicative of a hydraulic pressure $P_{CL1}$ applied to the clutch CL1 to control engaging pressure in the clutch CL1; an output signal of a brake engaging hydraulic pressure sensor 44 indicative of a hydraulic pressure $P_{BK1}$ applied to the brake BK1 to control engaging pressure in the brake BK1; and an output signal of a battery SOC sensor 46 indicative of a stored electric energy amount (state of charge) SOC of a battery 48.

The electronic control device 30 is also configured to generate various control commands to be applied to various portions of the drive system 10. Namely, the electronic control device 30 applies, to an engine control device 52, engine output control commands for controlling an output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL1 and CL2 and the brakes BK1 and BK2, to electromagnetic control valves such as linear solenoid operated valves provided in the hydraulic control unit 54, so that hydraulic pressures generated by those electromagnetic control valves are controlled to control the operating states of the clutches CL1 and CL2 and the brakes BK1 and BK2.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figure 3:
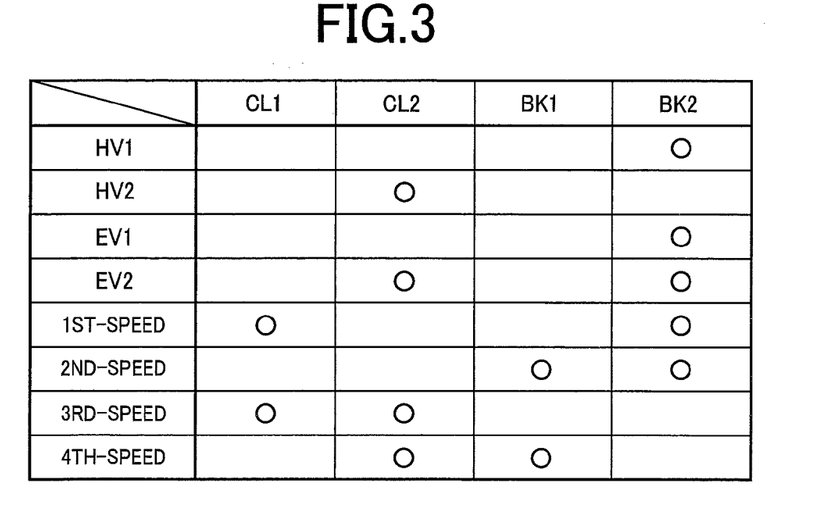
FIG. 3 is a table indicating combinations of operating states of clutches and brakes, which correspond to respective vehicle drive modes to be established in the hybrid vehicle drive system of FIG. 1.

In the hybrid vehicle provided with the drive system 10 constructed as described above, a selected one of a plurality of vehicle drive modes is established according to operating states of the engine 12 and the first and second electric motors MG1 and MG2, and the operating states of the clutches CL1 and CL2 and the brakes BK1 and BK2. FIG. 3 is the table indicating combinations of the operating states of the clutches CL1 and CL2 and the brakes BK1 and BK2, which correspond to the respective eight vehicle drive modes of the drive system 10. In this table, "o" marks represent the engaged states of the clutches and brakes while blanks represent their released states. Drive modes HV1 and HV2 are hybrid drive modes in which the engine 12 is operated as the vehicle drive power source while the first and second electric motors MG1 and MG2 are operated as needed to generate a vehicle drive force and/or an electric energy, and in which the speed ratio is electrically controllable in a continuously variable manner. In these hybrid drive modes, at least one of the first and second electric motors MG1 and MG2 is operated to generate a reaction force or placed in a non-loaded free state. Drive modes EV1 and EV2 indicated in FIG. 3 are electric motor drive modes (EV drive modes) in which the engine 12 is held at rest while at least one of the first and second electric motors MG1 and MG2 is used as the vehicle drive power source. Drive modes "$1^{st}$-speed" through "$4^{th}$-speed" are first-speed through fourth-speed constant-speed-ratio engine drive modes which are established when the differential functions of the first and second planetary gear sets 14 and 16 are limited, and in which the ratios of the output speeds of the first and second planetary gear sets 14 and 16 to the speed of the rotary motion received from the engine 12 are held constant at respective different values which decrease in the order from the drive mode "$1^{st}$-speed" toward the drive mode "$4^{th}$-speed".

In the drive system 10, the clutch CL1 and the brake BK1 are both placed in the released states, as indicated in FIG. 3, to permit the first planetary gear set 14 to perform the differential function with respect to the rotary motion received from the engine 12, in the hybrid drive modes in which the engine 12 is operated as the vehicle drive power source while the first and second electric motors MG1 and MG2 are operated as needed to generate a drive force and/or an electric energy. The hybrid drive mode HV1 is established when the brake BK2 is placed in the engaged state while the clutch CL2 is placed in the released state, and the hybrid drive mode HV2 is established when the brake BK2 is placed in the released state while the clutch CL2 is placed in the engaged state.

The clutch CL1 and the brake BK1 are both placed in the released states, to permit the first planetary gear set 14 to perform the differential function with respect to the rotary motion received from the engine 12, also in the electric motor drive modes in which at least one of the first and second electric motors MG1 and MG2 is operated as the vehicle drive power source while the engine 12 is held at rest. The electric motor drive mode EV1 is established when the brake BK2 is placed in the engaged state while the clutch CL2 is placed in the released state, and the electric motor drive mode EV2 is established when the brake BK2 and the clutch CL2 are both placed in the engaged states.

In the constant-speed-ratio engine drive modes in which ratios of the output speeds of the first and second planetary gear sets 14 and 16 to the speed of the rotary motion received from the engine 12 are held constant, either one of the clutch CL1 and the brake BK1 is placed in the engaged state to limit the differential function of the first planetary gear set 14 with respect to the rotary motion received from the engine 12. The constant-speed-ratio engine drive mode "$1^{st}$-speed" which is a first-speed drive mode having the highest speed ratio value is established when the clutch CL1 and the brake BK2 are placed in the engaged state while the clutch CL2 and the brake BK1 are placed in the released states. The constant-speed-ratio engine drive mode "$2^{nd}$-speed" which is a second-speed drive mode having a speed ratio value lower than that of the constant-speed-ratio engine drive mode "$1^{st}$-speed" is established when the clutches CL1 and CL2 are placed in the released states while the brakes BK1 and BK2 are placed in the engaged states. The constant-speed-ratio engine drive mode "$3^{rd}$-speed" which is a third-speed drive mode having a speed ratio value lower than that of the constant-speed-ratio engine drive mode "$2^{nd}$-speed" is established when the clutches CL1 and CL2 are placed in the engaged states while the brakes BK1 and BK2 are placed in the released states. The constant-speed-ratio engine drive mode "$4^{th}$-speed" which is a fourth-speed drive mode having the lowest ratio value is established when the clutch CL1 and the brake BK2 are placed in the released states while the clutch CL2 and the brake BK1 are placed in the engaged states.

As described above, the constant-speed-ratio engine drive modes "$1^{st}$-speed" through "$4^{th}$-speed" are established when respective combinations of two coupling elements selected from the clutch CL1, brake BK1, clutch CL2 and brake BK2 are placed in the engaged states, as indicated in FIG. 3. Further, the electric motor drive mode EV1 is established when the brake BK2 is placed in the engaged state, and the electric motor drive mode EV2 is established when the clutch CL2 and the brake BK2 are placed in the engaged states. Accordingly, the vehicle drive mode can be switched between one of the constant-speed-ratio engine drive modes "1st-speed" through "$4^{th}$-speed", and one of the first and second electric drive modes EV1 and EV2, by a simpler releasing or engaging action or actions of an appropriately selected one or ones of the four coupling elements. For instance, the vehicle drive mode can be switched from the constant-speed-ratio engine drive mode "$1^{st}$-speed" or "$2^{nd}$-speed" to the first electric motor drive mode EV1 by a simple releasing action of a selected one of the four coupling elements, namely, by a releasing action of the clutch CL1 or the brake BK1. Further, the vehicle drive mode can be switched from one of the constant-speed-ratio engine drive mode "$3^{rd}$-speed" or "$4^{th}$-speed" to the second electric motor drive mode EV2 by simple concurrent clutch-to-clutch switching actions of selected two of the four coupling elements, namely, by concurrent releasing action of the clutch CL1 and engaging action of the brake BK2, or concurrent releasing action of the brake BK1 and engaging action of the brake BK2.

Further, the vehicle drive mode is switched from the constant-speed-ratio engine drive mode "$1^{st}$-speed" or "$2^{nd}$-speed" to the second electric motor drive mode EV2 by a releasing action of a selected one of the four coupling elements and an engaging action of selected another of the four coupling elements, namely, by a releasing action of the clutch CL1 or the brake BK1, and an engaging action of the clutch CL2. On the other hand, the vehicle drive mode is switched from the constant-speed-ratio engine drive mode "$3^{rd}$-speed" or "$4^{th}$-speed" to the first electric motor drive mode EV1 by releasing actions of selected two of the four coupling elements and an engaging action of selected another of the four coupling elements, namely, by releasing actions of the clutch CL1 and the clutch CL2 or releasing actions of the clutch CL2 and the brake BK1, and an engaging action of the brake BK2. This drive mode switching operation by the releasing actions of selected two of the four coupling elements and the engaging action of selected another of the four coupling elements requires relatively complicated controls of torque and timing, and tends to be unstable and time-consuming, so that generation of a drive mode switching shock and deterioration of a drive mode switching response are unavoidable.

FIGS. 4-10 are the collinear chart having straight lines which permit indication thereon of the relative rotating speeds of the various rotary components of the drive system 10 (rotary elements of the first and second planetary gear sets 14 and 16), in respective different states of connection of the rotary elements corresponding to the respective different combinations of the operating states of the clutch CL2 and the brake BK2. These collinear charts are defined in a two-dimensional coordinate system having a horizontal axis along which the relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2a, Y2b, Y3, Y4a and Y4b arranged in the order of description in the rightward direction represent the respective relative rotating speeds of the various rotary elements. Namely, a solid line Y1 represents the rotating speed of the ring gear R1 of the first planetary gear set 14 (operating speed of the first electric motor MG1), and a solid line Y2a represents the rotating speed of the carrier C1 of the first planetary gear set 14 (operating speed of the engine 12), while a broken line Y2b represents the rotating speed of the ring gear R2 of the second planetary gear set 16. A broken line Y3 represents the rotating speed of the carrier C2 of the second planetary gear set 16 (output gear 28), and a solid line Y4a represents the rotating speed of the sun gear S1 of the first planetary gear set 14, while a broken line Y4b represents the rotating speed of the sun gear S2 of the second planetary gear set 16 (operating speed of the second electric motor MG2). In FIGS. 4-10, the vertical lines Y2a and Y2b are superimposed on each other, while the vertical lines Y4a and Y4b are superimposed on each other. Since the sun gears S1 and S2 are connected to each other, the relative rotating speeds of the sun gears S1 and S2 represented by the vertical lines Y4a and Y4b are equal to each other.

In FIGS. 4-10, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2b-Y4b) are determined by the gear ratios ρ1 and ρ2 of the first and second planetary gear sets 14 and 16. Described more specifically, regarding the vertical lines Y1, Y2a and Y4a corresponding to the respective three rotary elements of the first planetary gear set 14, a distance between the vertical lines Y2a and Y4a respectively corresponding to the carrier C1 and the sun gear S1 corresponds to "1", while a distance between the vertical lines Y1 and Y2a respectively corresponding to the ring gear R1 and the carrier C1 corresponds to the gear ratio "ρ1". Regarding the vertical lines Y2b, Y3 and Y4b corresponding to the respective three rotary elements of the second planetary gear set 16, a distance between the vertical lines Y3 and Y4b respective corresponding to the carrier C2 and the sun gear S2 corresponds to "1", while a distance between the vertical lines Y2b and Y3 respectively corresponding to the ring gear R2 and the carrier C2 corresponds to the gear ratio "ρ2". The drive modes of the drive system 10 will be described by reference to FIGS. 4-10.

Figure 4:
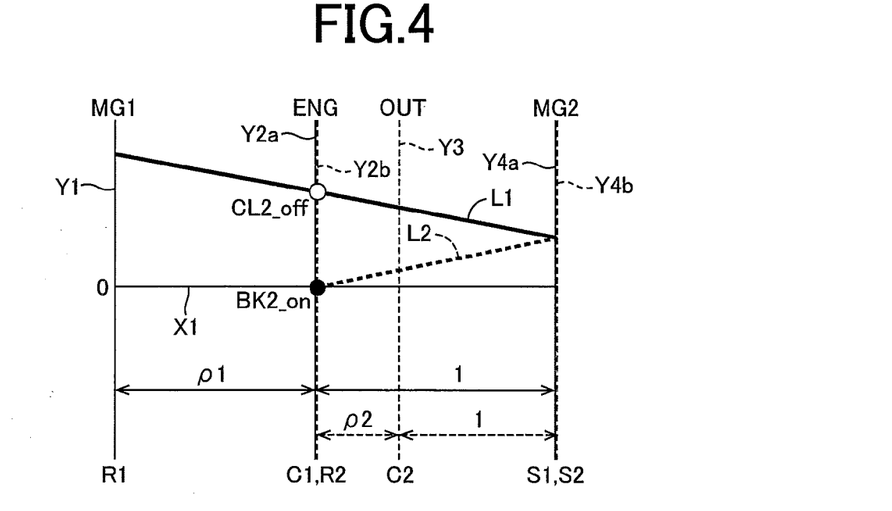
FIG. 4 is a collinear chart having straight lines which permit indication thereon of relative rotating speeds of various rotary elements of the drive system of FIG. 1, the collinear chart corresponding to a first hybrid drive mode HV1 and a first electric motor drive mode EV1 indicated in FIG. 3.

The collinear chart of FIG. 4 corresponds to the first hybrid drive mode HV1 of the drive system 10, which is the hybrid drive mode in which the engine 12 is used as the vehicle drive power source while the first and second electric motors MG1 and MG2 are operated as needed to generate a drive force and/or an electric energy. Described by reference to this collinear chart of FIG. 4, the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is connected (fixed) to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., a torque acting in a positive direction) generated by the second electric motor MG2 in the engaged state of the brake BK2.

Figure 5:
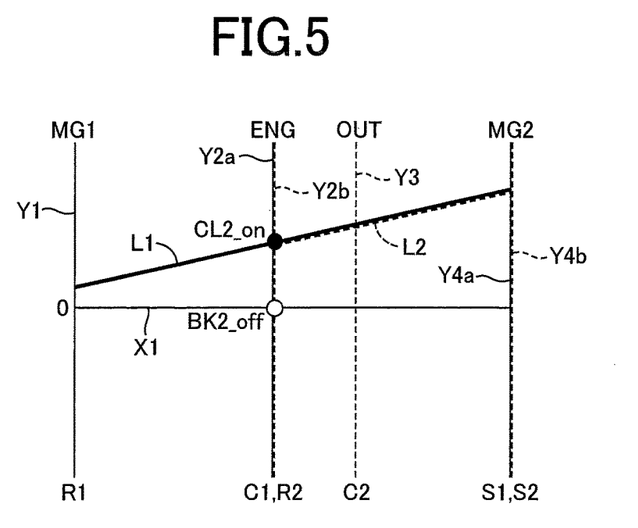
FIG. 5 is a collinear chart having straight lines which permit indication thereon of the relative rotating speeds of the rotary elements of the drive system of FIG. 1, the collinear chart corresponding to a second hybrid drive mode HV2 indicated in FIG. 3.

The collinear chart of FIG. 5 corresponds to the second hybrid drive mode HV2 of the drive system 10, which is the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 5, the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are connected to each other, are integrally rotated as a single rotary component. Namely, in the drive mode HV2 of the drive system 10, the first and second planetary gear sets 14 and 16 function as a differential device comprising a total of four rotary components. That is, the drive mode HV2 is a composite split mode in which the four rotary components are connected to each other in the order of description in the rightward direction as seen in FIG. 5. The four rotary components consist of: the ring gear R1 (connected to the first electric motor MG1); a rotary member consisting of the carrier C1 and the ring gear R2 connected to each other (and connected to the engine 12); the carrier C2 (connected to the output gear 28); and a rotary member consisting of the sun gears S1 and S2 connected to each other (and connected to the second electric motor MG2).

The collinear chart of FIG. 4 also corresponds to the first electric motor drive mode EV1 of the drive system 10, which is the EV drive mode in which the engine 12 is held at rest while the second electric motor MG2 is used as the vehicle drive power source. Described by reference to this collinear chart of FIG. 4, the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is connected to the stationary member in the form of the housing 26, so that the rotating speed of the ring gear R2 is held zero. In this drive mode EV1, the carrier C2, that is, the output gear 28 is rotated in the positive direction by a positive torque (i.e., a torque acting in a positive direction) generated by the second electric motor MG2 in the second planetary gear set 16. Namely, the hybrid vehicle provided with the drive system 10 can be driven in the forward direction with the positive torque generated by the second electric motor MG2. In this case, the first electric motor MG1 is preferably held in a free state.

Figure 6:
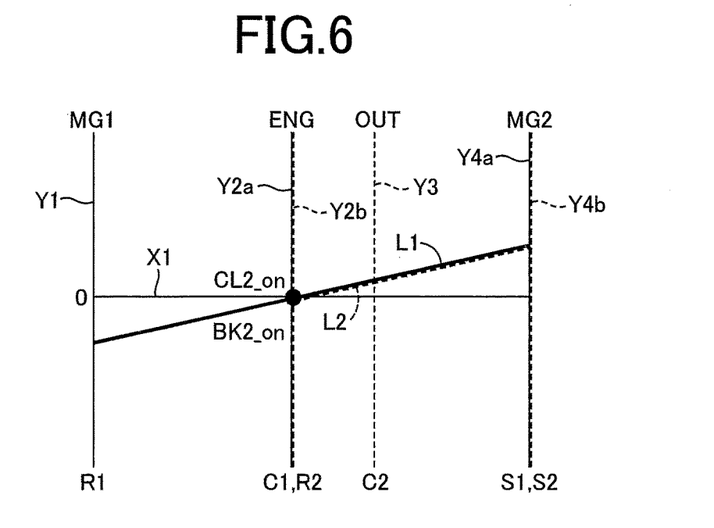
FIG. 6 is a collinear chart having straight lines which permit indication thereon of the relative rotating speeds of the rotary elements of the drive system of FIG. 1, the collinear chart corresponding to a second electric motor drive mode EV2 indicated in FIG. 3.
Figure 7:
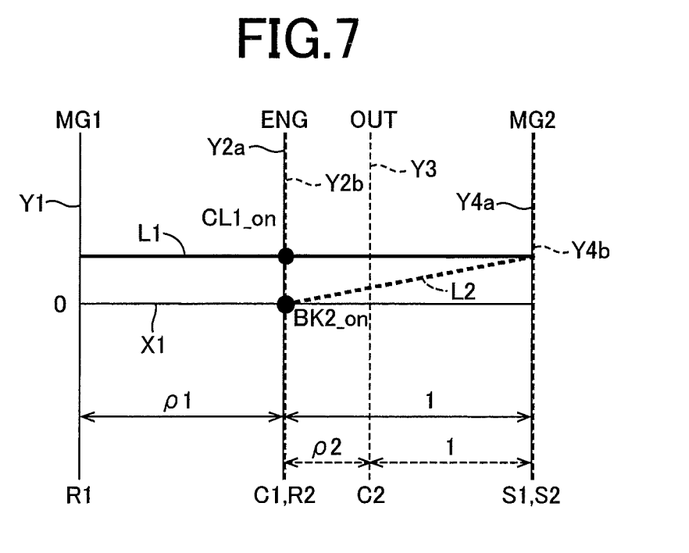
FIG. 7 is a collinear chart having straight lines which permit indication thereon of the relative rotating speeds of the rotary elements of the drive system of FIG. 1, the collinear chart corresponding to a constant-speed-ratio engine drive mode "$1^{st}$-speed" indicated in FIG. 3.
Figure 8:
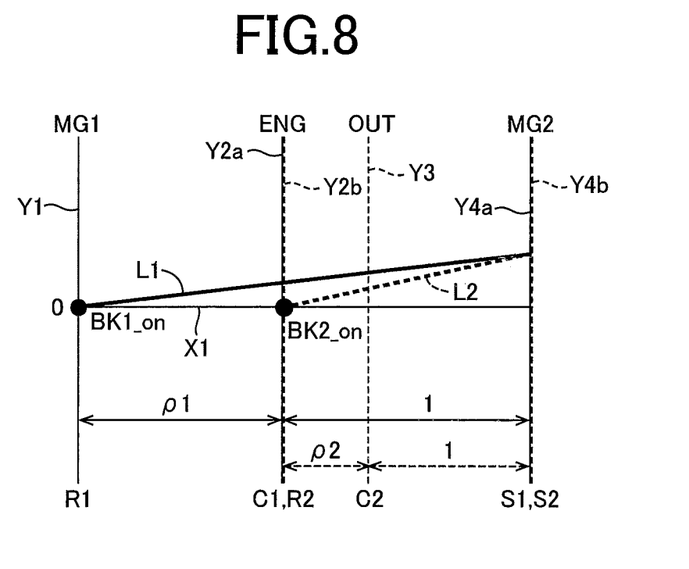
FIG. 8 is a collinear chart having straight lines which permit indication thereon of the relative rotating speeds of the rotary elements of the drive system of FIG. 1, the collinear chart corresponding to a constant-speed-ratio engine drive mode "$2^{nd}$-speed" indicated in FIG. 3.
Figure 9:
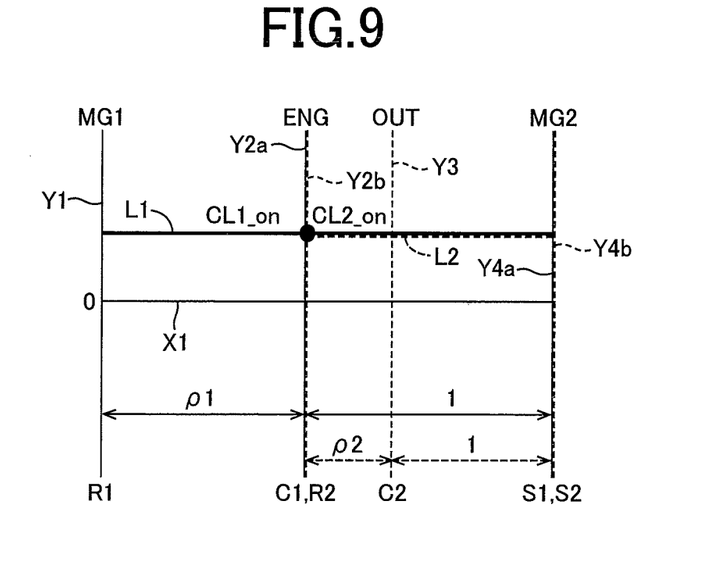
FIG. 9 is a collinear chart having straight lines which permit indication thereon of the relative rotating speeds of the rotary elements of the drive system of FIG. 1, the collinear chart corresponding to a constant-speed ratio engine drive mode "$3^{rd}$-speed" indicated in FIG. 3.
Figure 10:
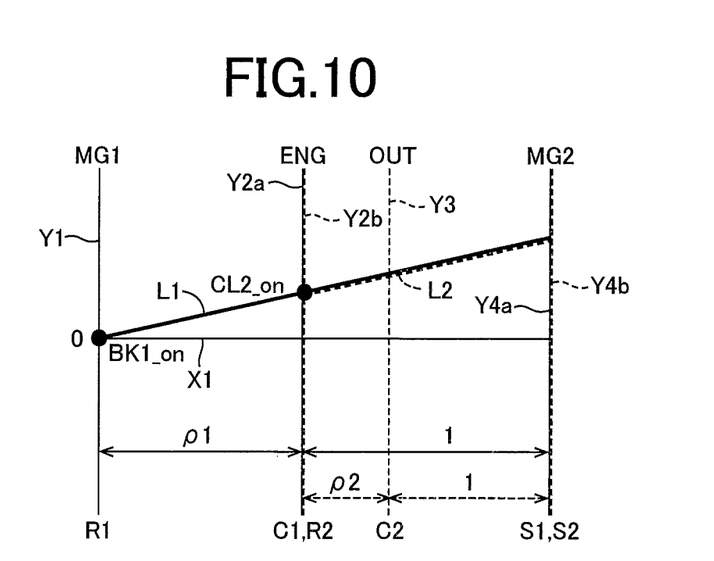
FIG. 10 is a collinear chart having straight lines which permit indication thereon of the relative rotating speeds of the rotary elements of the drive system of FIG. 1, the collinear chart corresponding to a constant-speed-ratio drive engine mode "$4^{th}$-speed" indicated in FIG. 3.

The collinear chart of FIG. 6 corresponds to the second electric motor drive mode EV2 of the drive system 10, which is the EV drive mode in which the engine 12 is held at rest while at least one of the first and second electric motors MG1 and MG2 is used as the vehicle drive power source. Described by reference to this collinear chart of FIG. 6, the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2 are connected to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (i.e., a torque acting in a negative direction) generated by the first electric motor MG1, and/or a positive torque (i.e., a torque acting in a positive direction) generated by the second electric motor MG2. That is, the hybrid vehicle provided with the drive system 10 can be driven in the forward direction when the torque is generated by at least one of the first and second electric motors MG1 and MG2.

The collinear charts of FIGS. 7-10 correspond to the respective four constant-speed-ratio engine drive modes "$1^{st}$-speed", "$2^{nd}$-speed", "$3^{rd}$-speed" and "$4^{th}$-speed" in which the engine 12 is operated as the vehicle drive power source, and which are established by engaging actions of respective combinations of the two coupling elements and have respective speed ratio values. That is, the constant-speed ratio engine drive mode "$1^{st}$-speed" is established in the engaged states of the clutch CL1 and the brake BK2, and the constant-speed ratio engine drive mode "$2^{nd}$-speed" is established in the engaged states of the brake BK1 and the brake BK2. The constant-speed-ratio engine drive mode "$3^{rd}$-speed" is established in the engaged states of the engaging actions of the clutch CL1 and the clutch CL2, and the constant-speed-ratio engine drive mode "$4^{th}$-speed" is established in the engaged states of the clutch CL2 and the brake BK1.

Figure 11:
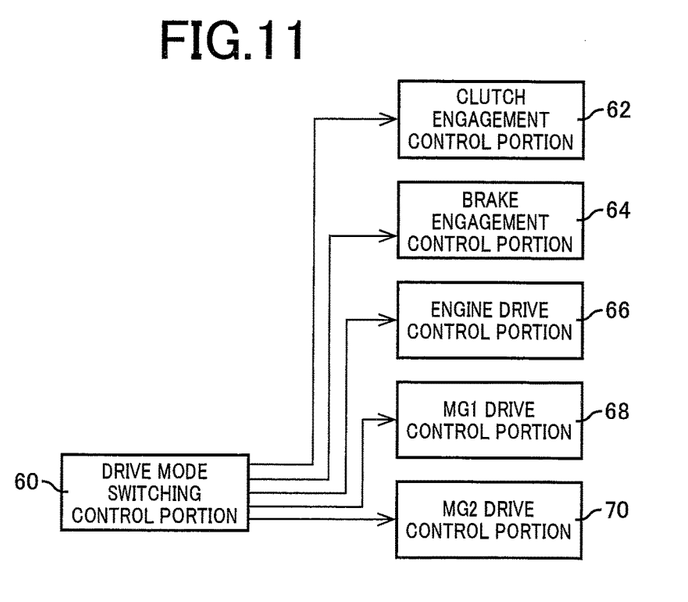
FIG. 11 is a functional block diagram illustrating major control functions of an electronic control device provided to control the hybrid vehicle drive system of FIG. 1.

FIG. 11 is the functional block diagram illustrating major control functions of the electronic control device 30. A drive mode switching control portion 60 shown in FIG. 11 is basically configured to determine the drive mode in which the drive system 10 should be placed so as to generate a required vehicle drive force with a high degree of fuel economy and such that the stored electric energy amount SOC of the battery 48 is held sufficiently large. Described more specifically, the drive mode switching control portion 60 selects one of the drive modes indicated in FIG. 3, on the basis of the accelerator pedal operation amount $A_{CC}$ detected by the accelerator pedal operation amount sensor 32, the vehicle running speed V corresponding to the output speed detected by the output speed sensor 40, the stored electric energy amount SOC of the battery 48 detected by the battery SOC sensor 46, etc., and according to a predetermined drive mode switching map.

When the vehicle drive mode is required to be switched from one of the constant-speed-ratio engine drive modes to one of the two electric motor drive modes, the drive mode switching control portion 60 selects an appropriate one of the two electric motor drives modes EV1 and EV2, depending upon the currently established constant-speed-ratio engine drive mode, so that the selected electric motor drive mode can be established within a relatively short time, by simple releasing and/or engaging action or actions of the selected coupling element or elements. For instance, when the vehicle drive mode is required to be switched from one of the constant-speed-ratio engine drive modes "$1^{st}$-speed" and "$2^{nd}$-speed", the drive mode switching control portion 60 selects the first electric motor drive mode EV1, so that the first electric motor drive mode EV1 can be established by a simple releasing action of one coupling element in the form of the clutch CL1 or the brake BK1. When the vehicle drive mode is required to be switched from one of the constant-speed-ratio engine drive modes "$3^{rd}$-speed" and "$4^{th}$-speed", the drive mode switching control portion 60 selects the second electric motor drive mode EV2, so that the second electric motor drive mode EV2 can be established by simple concurrent clutch-to-clutch switching actions of the selected two coupling elements, namely, by the releasing action of the clutch CL1 and the engaging action of the brake BK2, or the releasing action of the brake BK1 and the engaging action of the brake BK2.

A clutch engagement control portion 62 is configured to control the operating states of the clutches CL1 and CL2 through the hydraulic control unit 54. Described more specifically, the clutch engagement control portion 62 controls output hydraulic pressures of solenoid controlled valves provided in the hydraulic control unit 54 to control the clutches CL1 and CL2, for controlling the hydraulic pressures $P_{CL1}$ and $P_{CL2}$ which determine the operating states (torque capacities) of the clutches CL1 and CL2. The clutch engagement control portion 62 is preferably configured to control the operating states of the clutches CL1 and CL2, according to the drive mode selected by the drive mode switching control portion 60. Namely, the clutch engagement control portion 62 is basically configured to control the torque capacity of the clutch CL1, so as to place the clutch CL1 in the engaged state when the drive mode switching control portion 60 has determined that the drive system 10 should be switched to the drive mode "$1^{st}$-speed" or "$3^{rd}$-speed", and so as to place the clutch CL1 in the released state when the drive mode switching control portion 60 has determined that the drive system 10 should be switched to the drive mode HV1, HV2, EV1, EV2, "$2^{nd}$-speed" or "$4^{th}$-speed". Further, the clutch engagement control portion 62 controls the torque capacity of the clutch CL2 so as to place the clutch CL2 in the engaged state when the drive mode switching control portion 60 has determined that the drive system 10 should be switched to the drive mode HV2, EV2, "$3^{rd}$-speed" or "$4^{th}$-speed", and so as to place the clutch CL2 in the released state when the drive mode switching control portion 60 has determined that the drive system 10 should be switched to the drive mode HV1, EV1, "$1^{st}$-speed" or "$2^{nd}$-speed".

A brake engagement control portion 64 is configured to control the operating states of the brakes BK1 and BK2 through the hydraulic control unit 54. Described more specifically, the brake engagement control portion 64 controls output hydraulic pressures of solenoid controlled valves provided in the hydraulic control unit 54 to control the brakes BK1 and BK2, for controlling the hydraulic pressures $P_{BK1}$ and $P_{BK2}$ which determine the operating states (torque capacities) of the brakes BK1 and BK2. The brake engagement control portion 64 is preferably configured to control the operating states of the brakes BK1 and BK2, according to the drive mode selected by the drive mode switching control portion 60. Namely, the brake engagement control portion 64 is basically configured to control the torque capacity of the brake BK1, so as to place the brake B1 in the engaged state when the drive mode switching control portion 60 has determined that the drive system 10 should be switched to the drive mode "$2^{nd}$-speed" or "$4^{th}$-speed", and so as to place the brake BK1 in the released state when the drive mode switching control portion 60 has determined that the drive system 10 should be switched to the drive mode HV1, HV2, EV1, EV2, "$1^{st}$-speed" or "$3^{rd}$-speed". Further, the brake engagement control portion 64 controls the torque capacity of the brake BK2 so as to place the brake BK2 in the engaged state when the drive mode switching control portion 60 has determined that the drive system 10 should be switched to the drive mode HV1, EV1, EV2, "$1^{st}$-speed" or "$2^{nd}$-speed", and so as to place the brake BK2 in the released state when the drive mode switching control portion 60 has determined that the drive system 10 should be switched to the drive mode HV2, "$3^{rd}$-speed" or "$4^{th}$-speed".

An engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output). Further, the engine drive control portion 66 temporarily reduces the output torque of the engine 12 during a shifting action of the drive system 10, for reducing a shifting shock of the drive system 10.

An MG1 drive control portion 68 is configured to control an operation of the first electric motor MG1 through the inverter 50. For example, the MG1 drive control portion 68 controls an amount of an electric energy to be supplied from the battery 48 to the first electric motor MG1 through the inverter 50, so that the first electric motor MG1 generates a required output, that is, a target torque (target MG1 output). An MG2 drive control portion 70 is configured to control an operation of the second electric motor MG2 through the inverter 50. For example, the MG2 drive control portion 70 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a required vehicle drive force to be generated by the drive system 10 (output gear 28) is calculated on the basis of the operation amount or angle Acc of the accelerator pedal detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the MG1 and MG2 drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

Figure 12:
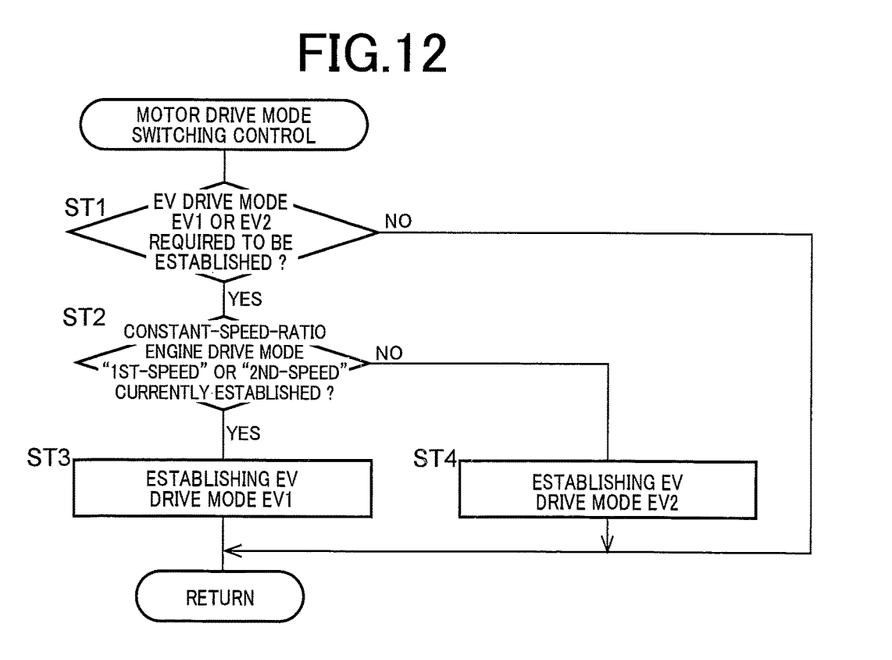
FIG. 12 is a flow chart illustrating a major portion of one example of a drive mode switching control implemented by the electronic control device provided to control the hybrid vehicle drive system of FIG. 1.

FIG. 12 is the flow chart illustrating a major portion of one example of the drive mode switching control implemented by the electronic control device 30. This drive mode switching control is implemented with a predetermined cycle time. Each step in the flow chart corresponds to respective operations in drive mode switching control portion 60.

The drive mode switching control is initiated with a step ST1, to determine whether the drive system 10 is required to be placed in the EV drive mode EV1 or EV2, while the drive system 10 is currently placed in any one of the constant-speed-ratio engine drive modes. This determination is made on the basis of the operation amount or angle Acc of the accelerator pedal detected by the accelerator pedal operation amount sensor 32, the vehicle running speed V corresponding to the output speed detected by the output speed sensor 40, the stored electric energy amount SOC of the battery 48 detected by the battery SOC sensor 46, etc., and according to a predetermined drive mode switching map. If a negative determination is obtained in the step ST1, the present routine is terminated. If an affirmative determination is obtained in the step ST1, the control flow goes to a step ST2 to determine whether the drive system 10 is currently placed in the constant-speed-ratio engine drive mode "$1^{st}$-speed" or "$2^{nd}$-speed". If an affirmative determination is obtained in the step ST2, that is, if the drive system 10 is currently placed in the constant-speed-ratio engine drive mode "$1^{st}$-speed" or "$2^{nd}$-speed", the control flow goes to a step ST3 to newly select the first electric motor drive mode EV1, and to establish the selected first electric motor drive mode EV1 by simply releasing one coupling element, that is, by releasing the clutch CL1 or the brake BK1. If a negative determination is obtained in the step ST2, that is, if the drive system 10 is currently placed in the constant-speed-ratio engine drive mode "$3^{rd}$-speed" or "$4^{th}$-speed", the control flow goes to a step ST4 to newly select the second electric motor drive mode EV2, and to establish the selected second electric motor drive mode EV2 by simply performing so-called "clutch-to-clutch" switching actions, that is, by releasing the clutch CL1 while engaging the brake BK2, or by releasing the brake BK1 while engaging the brake BK2.

As describe above, the hybrid vehicle drive system 10 according to the illustrated embodiment of the invention includes: the differential device which comprises the first planetary gear set 14 and the second planetary gear set 16 and which comprises the four rotary components; the engine 12, the first electric motor MG1, the second electric motor MG2 and an output rotary member in the form of the output gear 28 which are respectively connected to the four rotary components; and the plurality of coupling elements (CL1, CL2, BK1 and BK2) which are provided to selectively connect the rotary components to each other or to a stationary member in the form of the housing 26, to establish a selected one of the plurality electric motor drive modes EV1 and EV2 and the plurality of constant-speed-ratio engine drive modes "$1^{st}$-speed", "$2^{nd}$-speed", "$3^{rd}$-speed" and "$4^{th}$-speed", such that one of the electric motor drive modes EV1 and EV2 which is to be established is determined depending upon whether one of the coupling elements is placed in an engaged state or not, and such that one of the constant-speed-ratio engine drive modes which is to be established is determined depending upon one of combinations of two of the coupling elements which are placed in engaged states, the drive system being constructed such that one of the electric motor drive modes can be established by releasing one (CL1 or BK1) of the two coupling elements which are placed in the engaged state in a presently established one of the constant-speed-ratio engine drive modes, when the drive system 10 is required to be switched from the above-described one of the plurality of constant-speed-ratio engine drive modes to any one of the plurality of electric motor drive modes. Accordingly, the drive system 10 can be efficiently switched from any one of the plurality of constant-speed-ratio engine drive modes to one of the electric motor drive modes, by simply releasing one of the two coupling elements placed in the engaged state in the presently established constant-speed-ratio engine drive mode, so that the deterioration of drivability of the hybrid vehicle due to a change of the drive mode from one of the constant-speed-ratio engine drive modes to the above-indicated one of the electric motor drive modes can be effectively reduced.

Further, the present hybrid vehicle drive system 10 according to the illustrated embodiment is constructed such that the plurality of electric motor drive modes include the first electric motor drive mode EV1 and the second electric motor drive mode EV2, while the plurality of constant-speed-ratio engine drive modes include the first-speed constant-speed-ratio engine drive mode ("1$^{st}$-speed", "2$^{nd}$-speed") and the second-speed constant-speed-ratio engine drive mode ("3$^{rd}$-speed", "4$^{th}$-speed"), and the plurality of coupling elements include the first coupling element in the form of the brake BK2 for establishing the first electric motor drive mode EV1, the second coupling element in the form of the clutch CL2 for establishing the second electric motor drive mode EV2 together with said first coupling element (brake BK2), the third coupling element in the form of the clutch CL1 or the brake BK1 which is placed in the engaged state together with the first coupling element (brake BK2) for establishing the first-speed constant-speed-ratio engine drive mode ("1$^{st}$-speed", "2$^{nd}$-speed") together with said first coupling element (brake BK2), and the fourth coupling element in the form of the clutch CL1 or the brake BK1 which is placed in the engaged state together with the second coupling element (clutch CL2) for establishing the second-speed constant-speed-ratio engine drive mode together with said second coupling element (clutch CL2). The drive system 10 can be efficiently switched from the first-speed constant-speed-ratio engine drive mode ("1$^{st}$-speed", "2$^{nd}$-speed") to the first electric motor drive mode EV1 by simply releasing the third coupling element in the form of the clutch CL1 or the brake BK1), and from the second-speed constant-speed-ratio engine drive mode ("3$^{rd}$-speed", "4$^{th}$-speed") to the second electric motor drive mode EV2 by simply releasing the fourth coupling element in the form of the clutch CL1 or the brake BK1) and engaging the second coupling element in the form of the clutch CL2. Accordingly, it is possible to reduce the deterioration of drivability of the hybrid vehicle due to a change of the drive mode from one of the first and second constant-speed-ratio engine drive modes to one of the first and second electric motor drive modes.

Further, the hybrid vehicle drive system 10 according to the illustrated embodiment comprises: a first differential mechanism in the form of the first planetary gear set 14 and a second differential mechanism in the form of the second planetary gear set 16 each of which includes at least three rotary elements and which are configured such that one of the at least three rotary elements of the first planetary gear set 14 and one of the at least three rotary elements of the second planetary gear set 16 are connected to each other; the engine 12 and the first electric motor MG1 which are respectively connected to two rotary elements of the at least three rotary elements of the first planetary gear set 14, which two rotary elements are not connected to the above-described one of the at least three rotary elements of the second planetary gear set 16; the second electric motor MG2 connected to the above-described one of the at least three rotary elements of the second planetary gear set 16; an output rotary member in the form of the output gear 28 connected to one of two rotary elements of the second planetary gear set 16, which two rotary elements are not connected to the above-described one of the at least three rotary elements of the first planetary gear set 14; the first clutch CL1 for selectively connecting the above-described two rotary elements of the at least three rotary elements of the first planetary gear set 14 to each other; the second clutch CL2 for selectively connecting the rotary element of the first planetary gear set 14 connected to the engine 12 and the other of the above-described two rotary elements of the second planetary gear set 16 to each other; the first brake BK1 for selectively connecting the rotary element of the first planetary gear set 14 connected to the first electric motor MG1 to a stationary member in the form of the housing 26; and the second brake BK2 for selectively connecting the other of the above-described two rotary elements of the first planetary gear set 14 to the housing 26, and wherein: the first electric motor drive mode EV1 is established in the engaged state of the second brake; the second electric motor drive mode EV2 is established in the engaged states of the second clutch and the second brake; the first-speed constant-speed-ratio engine drive mode "1$^{st}$-speed" is established in the engaged states of the first clutch and the second brake; the second-speed constant-speed-ratio engine drive mode "2$^{nd}$-speed" is established in the engaged states of the first brake and the second brake; the third-speed constant-speed-ratio engine drive mode "3$^{rd}$-speed" is established in the engaged states of the first clutch and the second clutch; the fourth-speed constant-speed-ratio engine drive mode "4$^{th}$-speed" is established in the engaged states of the second clutch and the first brake; the drive system is switched from one of the first-speed and second-speed constant-speed-ratio engine drive modes to the first electric motor drive mode; and the drive system is switched from one of the third-speed and fourth-speed constant-speed-ratio engine drive modes to the second electric motor drive mode. Accordingly, the hybrid vehicle drive system is switched from the first-speed or second-speed constant-speed-ratio engine drive mode to the first electric motor drive mode by releasing one coupling element, and from the third-speed or fourth-speed constant-speed-ratio engine drive mode to the second electric motor drive mode by releasing one coupling element and engaging one coupling element. Thus, the drive system can be efficiently switched from one of the first-speed, second-speed, third-speed and fourth-speed constant-speed-ratio engine drive modes to one of the first and second electric motor drive modes, with reduced deterioration of drivability of the hybrid vehicle.

Although the hybrid vehicle drive system 10 according to the illustrated embodiment has the four constant-speed-ratio engine drive modes "1$^{st}$-speed" through "4$^{th}$-speed", the hybrid vehicle drive system according to the present invention may have only some of those constant-speed-ratio engine drive modes, or may be additionally provided with a transmission so that the drive system 10 has five or more constant-speed-ratio engine drive modes including the drive modes "1$^{st}$-speed" through "4$^{th}$-speed".

In the drive system 10, the crankshaft 12a of the engine 12 and the carrier C1 of the first planetary gear set 14 are connected directly to each other. However, the crankshaft 12a and the carrier C1 may be connected indirectly to each other through a damper, for instance.

While the preferred embodiment of this invention has been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
BK1: Brake (Coupling element; First brake)
BK2: Brake (Coupling element; Second brake)
CL1: Clutch (Coupling element; First clutch)

CL2: Clutch (Coupling element; Second clutch)
MG1: First electric motor
MG2: Second electric motor

The invention claimed is:

1. A drive system of a hybrid vehicle including:
a differential device which comprises a first differential mechanism and a second differential mechanism and which comprises four rotary components;
an engine, a first electric motor, a second electric motor and an output rotary member which are respectively connected to the four rotary components;
a plurality of coupling elements which are provided to selectively connect the rotary components to each other or to a stationary member, to establish a selected one of a plurality of electric motor drive modes and a plurality of constant-speed-ratio engine drive modes, such that:
 (i) a first electric motor drive mode of the plurality of electric motor drive modes is established in an engaged state of a first coupling element of the plurality of coupling elements,
 (ii) a second electric motor drive mode of the plurality of electric motor drive modes is established in an engaged state of a second coupling element of the plurality of coupling elements and in the engaged state of the first coupling element,
 (iii) a first-speed constant-speed-ratio engine drive mode of the plurality of constant-speed-ratio engine drive modes is established in an engaged state of a third coupling element of the plurality of coupling elements and in the engaged state of the first coupling element, and
 (iv) a second-speed constant-speed-ratio engine drive mode of the plurality of constant-speed-ratio engine drive modes is established in an engaged state of a fourth coupling element of the plurality of coupling elements and in the engaged state of the second coupling element; and
an electronic control device configured to
 (a) select one of the first and second electric motor drive modes that is to be established, depending upon a currently established constant-speed-ratio engine drive mode, when the drive system is required to be switched from one of the first and second constant-speed-ratio engine drive modes to any one of the first and second electric motor drive modes, and
 (b) select the first electric motor drive mode when the currently established constant-speed-ratio engine drive mode is the first-speed constant-speed-ratio engine drive mode, and select the second electric motor drive mode when the currently established constant-speed-ratio engine drive mode is the second-speed constant-speed-ratio engine drive mode.

2. A drive system of a hybrid vehicle comprising:
a first differential mechanism and a second differential mechanism each of which includes at least three rotary elements and which are configured such that one of the at least three rotary elements of the first differential mechanism and one of the at least three rotary elements of the second differential mechanism are connected to each other;
an engine and a first electric motor which are respectively connected to two rotary elements of the at least three rotary elements of the first differential mechanism, which two rotary elements are not connected to the one of the at least three rotary elements of the second differential mechanism;
a second electric motor connected to the one of the at least three rotary elements of the second differential mechanism;
an output rotary member connected to one of two rotary elements of the second differential mechanism, which two rotary elements are not connected to the one of the at least three rotary elements of the second differential mechanism;
a first clutch for selectively connecting the two rotary elements of the at least three rotary elements of the first differential mechanism to each other;
a second clutch for selectively connecting the rotary element of the first differential mechanism connected to the engine and the other of the two rotary elements of the second differential mechanism to each other;
a first brake for selectively connecting the rotary element of the first differential mechanism connected to the first electric motor to a stationary member; and
a second brake for selectively connecting the other of the two rotary elements of the second differential mechanism to the stationary member, wherein
 (i) a first electric motor drive mode is established in an engaged state of the second brake;
 (ii) a second electric motor drive mode is established in an engaged state of the second clutch and in the engaged state of the second brake;
 (iii) a first-speed constant-speed-ratio engine drive mode is established in an engaged state of the first clutch and in the engaged state of the second brake;
 (iv) a second-speed constant-speed-ratio engine drive mode is established in an engaged state of the first brake and in the engaged state the second brake;
 (v) a third-speed constant-speed-ratio engine drive mode is established in the engaged states of the first clutch and the second clutch; and
 (vi) a fourth-speed constant-speed-ratio engine drive mode is established in the engaged states of the second clutch and the first brake; and
an electronic control device configured to
 (a) select one of the first and second electric motor drive modes that is to be established, depending upon a currently established constant-speed-ratio engine chive mode, when the drive system is required to be switched from one of the first-speed, second-speed, third-speed and fourth-speed constant-speed-ratio engine drive modes to any one of the first and second electric motor drive modes, and
 (b) select the first electric motor drive mode when the currently established constant-speed-ratio engine drive mode is the first-speed constant-speed-ratio engine drive mode or the second-speed constant-speed-ratio engine drive mode, and select the second electric motor drive mode when the currently established constant-speed-ratio engine drive mode is the third-speed constant-speed-ratio engine drive mode or the fourth-speed constant-speed-ratio engine drive mode.

* * * * *